UNITED STATES PATENT OFFICE 2,545,094

ACYLATED AMINO DIOLS

Loren M. Long, Grosse Pointe Woods, and Harvey D. Troutman, Ferndale, Mich., assignors to Parke, Davis & Company, Detroit, Mich., a corporation of Michigan No Drawing. Application January 21, 1950, Serial No. 139,957

7 Claims. (Cl. 260—487)

This application is a continuation in part of our co-pending application Serial No. 83,770, filed March 26, 1949, now U. S. Patent No. 2,516,130, issued July 25, 1950, and the invention relates to new chemical compounds and to chemical methods useful for their synthesis. More particularly, the invention relates to a new class of acylated amino diols and to methods for obtaining these products. The acylated amino diols of the invention can be represented by the formula,

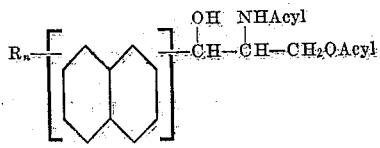

where $n$ is 1 or 2 and R is the same or different and represents hydrogen, halogen, nitro, lower alkyl, and lower alkoxy radicals. The term "acyl" as used herein includes saturated and unsaturated lower aliphatic acyl, halogen substituted lower aliphatic acyl, carboxy substituted lower aliphatic acyl, cyano substituted lower aliphatic acyl, ether substituted lower aliphatic acyl, hydroxy substituted lower aliphatic acyl, ester substituted lower aliphatic acyl, benzoyl, substituted benzoyl, araliphatic acyl, furoyl, pyridinoyl and the like.

It will be appreciated by those skilled in the art that the products and starting materials of the invention can exist in structural as well as optical isomeric forms. The term "structural" isomer or form as used herein refers to the cis or trans, that is, the planar relationship of the polar groups on the two asymmetric carbon atoms. To differentiate between these two possible diastereoisomers we will subsequently refer to the cis compounds as the "regular" (reg. series or form and to the trans diastereoisomers as the "pseudo" ($\psi$) series or form. Such cis compounds are those wherein the two most highly polar groups lie on opposite sides of the plane of the two carbon atoms.

Both the regular and pseudo forms exist as racemates of the optically active dextro (d) and levo (l) rotatory isomers as well as in the form of the individual or separated dextro (d) and levo (l) optical isomers.

Because of the difficulty of representing these structural differences in graphic formulae the customary structural formulae will be used in both the specification and claims and a notation placed below or to the side of the formula to designate the particular structural and optical configuration of the compound. Where the formula represents the unresolved mixture of the structural and optical isomers the notation "unresolved" will be used. However, it should be expressly understood that where no notation appears with a structural formula that the formula should be interpreted in its generic sense, that is, as representing the (l) $=\psi$, (d) $=\psi$, (l) $=$reg. or (d) $=$reg. isomers in separated form as well as the (dl) $=\psi$ or (dl) $=$ reg. optical racemates or the total unresolved mixture of structural and optical isomers. Such a formula does not merely represent the unresolved mixture of isomers.

In accordance with the invention acylated amino diols of the above general formula are prepared by several different methods. One of these methods comprises reducing acylated amido keto alcohols of the following formula,

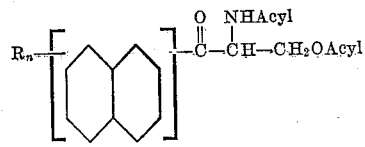

The transformation may be illustrated diagrammatically as follows:

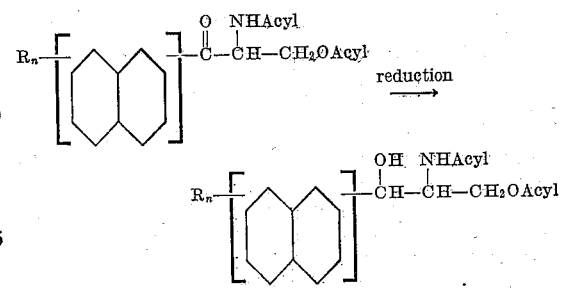

where R and $n$ have the same significance as given above. The reduction may be carried out using hydrogen gas in conjunction with a metal hydrogenation catalyst or by the use of nascent hydrogen generated in the reaction mixture by the interaction of a metal with an acid, lower aliphatic alcohol, water, or mixtures of the same. In carrying out the hydrogenation by catalytic means, hydrogen pressures ranging from 25 to 4000 lbs./sq. in. and temperatures below about 100° C. can be used. However, in order to lessen hydrogenolysis of the product it is preferable to keep the temperature and pressure as low as possible. A temperature of about 25° to 45° C. and pressure of about 40 to 1000 lbs./sq. in. are usually sufficient to bring about reduction within a reasonable time and hence are preferred. Some examples of the hydrogenation catalysts which can be employed are Raney nickel, palladium, palladium oxide, platinum, platinum oxide and the like. Suitable solvents for the reduction include lower aliphatic alcohols and aqueous solutions of the same, lower aliphatic acids, dioxane-water mixtures and the like. When using the nascent hydrogen method of reduction, metals or alloys such as sodium, potassium, calcium, sodium amalgam, potassium amalgam, iron, and the like are caused to react with the solvent used for the reaction to produce hydrogen in the reaction mixture. Some examples of the solvents which may be used are lower aliphatic alcohols such as methanol, ethanol, propanol; lower aliphatic acids, such as acetic acid and aqueous mixtures of either lower aliphatic alcohols or acids; moist dialkyl ethers such as diethyl ether and lower aliphatic alcohol-acid-water mixtures. Specific combinations of these metals and solvents which have been found to be particularly effective in bringing about the reduction of the ketonic compounds are sodium, potassium, or calcium and absolute ethanol or methanol; sodium or potassium amalgam in moist ether, ethanol or acetic acid; and iron in dilute ethanol containing acetic acid. Although either of the foregoing methods of reduction can be used with about equal success in most instances, there are, of course, instances where such methods of reduction cannot be employed. For example, where the product of the invention to be reduced contains a nitro substituent in the phenyl ring, the desired product must be obtained by one of the following methods of preparation. These methods of preparing the products of the invention consist in the acylation of acylamido alkane diols of the following formula,

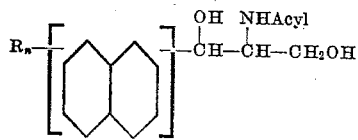

and the acylation of amino alkane diols of the following formula,

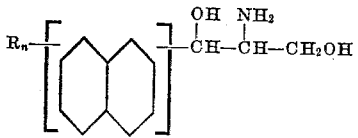

In carrying out the acylation under substantially anhydrous conditions with an acyl anhydride the reaction mixture is heated at about 60–135° C. for a short period of time. In most cases the reaction mixture need only be heated for about five to thirty minutes. If desired the reaction can be carried out at lower temperatures by allowing the reaction to proceed for a proportionately longer period of time. In general, however, the reaction is preferably carried out at about 70–100° C. for about one-half hour. When an acyl halide is used as the acylating agent under substantially anhydrous conditions and in the absence of a catalyst, the reaction is carried out at a temperature below about 50° C. As a precaution against side reactions, it is preferable to use only a slight excess of the acyl halide over that required for reaction with the terminal hydroxyl group and, in the necessary instances, the amino group. When the alkaline catalyst is used in conjunction with either an acyl halide or anhydride, the reaction can be carried out at lower temperatures and within a shorter time. In general, the quantity of acylating agent should not be much in excess of that required to react with the terminal hydroxyl group and, where a free amino diol is used as the starting group, with the amino group. The preferred temperature for the reaction ranges from 20–35° C. although the mixture can be heated to as high as 100° C. if desired.

If an alkaline catalyst is employed the acylation can be carried out using an acyl halide and an aqueous medium at a temperature between about 0°–35° C. As in some of the previously described modifications of the present acylation process, it is preferable to use only the theoretically required amount. When the acyl groups are of a type which are readily hydrolyzed, such as lower aliphatic acyl groups, the alkaline catalyst should be a relatively weak alkaline substance such as barium carbonate, calcium carbonate, magnesium carbonate, sodium acetate or the like; however, where the acyl groups are of the type more resistant to hydrolysis, such as benzoyl or substituted benzoyl radicals, strongly alkaline catalysts such as sodium hydroxide and the like may be employed. Some specific examples of the alkaline materials which may be used in the above described acylation processes are sodium hydroxide, potassium hydroxide, lithium hydroxide, sodium carbonate, potassium carbonate, sodium bicarbonate, sodium acetate, calcium hydroxide, calcium carbonate, barium carbonate, magnesium carbonate, barium hydroxide, pyridine, triethylamine, quinoline, N-ethyl morpholine, N-methyl piperidine, and the like.

As pointed out above, the amino diols of the invention and their acylated derivatives can exist in structural as well as optical isomeric forms. Where a particular optical isomeric form or optical racemate of one of the two structural forms of these products is desired, it is necessary to separate the unresolved amino diol or acylated amino diol into its two component structural isomers. This is accomplished quite readily and completely by utilization of the differences in solubility of the two forms in water, organic solvents or in water-organic solvent mixtures. Some of the organic solvents which can be used in this fractional crystallization or solubilization are lower aliphatic alcohols, acetone, chloroform, ethyl acetate and the like. In some cases, the solvent solubility differential of the two forms is not great enough to afford a clean-cut separation of the two structural isomers and in these cases it is preferable to convert the isomer mixture of the free amino diol or acylated amino diol into another acylated derivative of the amino diol whose structural isomers differ more markedly in their solubility characteristics. The structural isomers of this new acylated amino diol can then be separated by fractional crystallization and the appropriate structural form of the product so obtained converted either by acylation or hydrolysis to the desired structural form of the free amino diol or acylated amino diol.

Where a particular optical isomer of the amino diol or acylated derivative thereof is desired the corresponding regular or pseudo structural form of the 1-naphthyl-2-aminopropane-1,3-diol is resolved into its optical isomers via an optically active acid addition salt. This resolution which must be carried out on the free amino diol is performed by forming an acid addition salt of the racemic amine with an optically active acid such as (d)-tartaric, (l)-tartaric, (d)-mandelic, (l)-mandelic, (d)-bromcamphor sulfonic, (l)-bromcamphor sulfonic, (d)-camphor sulfonic and (l)-camphor sulfonic, separating the two isomeric salts by recrystallization from a solvent such as a lower aliphatic alcohol or mixtures of the same with water or other organic solvents and then regenerating the individual optical isomers from the separated optically active acid addition salts by neutralizing each one separately. When carrying out this resolution it is desirable, but not absolutely necessary, to choose the form of the optically active acid so that the desired optical isomer will separate from the crystallization solution first.

The products of the invention are valuable intermediates for the preparation of other organic compounds possessing antibiotic activity.

The invention is illustrated by the following examples:

Example 1

10 g. of (dl)-ψ-1-(1-naphthyl)-2-aminopropane-1,3-diol is heated with an excess of acetic anhydride at 70° C. for fifteen minutes. The reaction mixture is evaporated to dryness in vacuo and the residue recrystallized from ethanol. The white crystalline solid thus obtained is (dl)-ψ-1-(1-naphthyl)-2-acetamido-3-acetoxypropane-1-ol of formula,

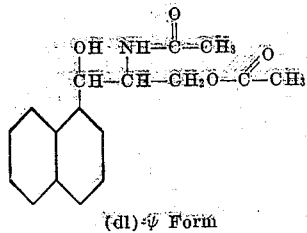

(dl)-ψ Form

Example 2

50 g. of 6-methyl-2-naphthyl α-p-toluylamido-β-acetoxyethyl ketone is dissolved in one liter of ethanol, and 5 g. of Raney nickel hydrogenation catalyst is added. The mixture is shaken with gaseous hydrogen under about 50 lbs./sq. in. pressure for three to four hours at room temperature. The catalyst is removed by filtration and the filtrate heated to boiling and mixed with a half volume of hot water. The (dl)-ψ-1-(6-methyl-2-naphthyl)-2-p-toluylamido-3-acetoxypropane-1-ol which separates from the cool solution is collected and purified by recrystallization from dilute ethanol. The formula of this product is,

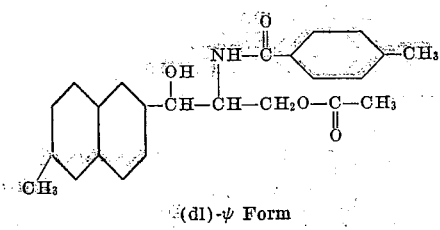

(dl)-ψ Form

Evaporation of the mother liquors and recrystallization of the residue yields the (dl)-reg. form.

Example 3

5 g. of (dl)-ψ-1-(4-nitro-1-naphthyl)-2-dichloroacetamidopropane-1,3-diol is heated at 80° C. for one-half hour with 20 cc. of acetic anhydride and then the reaction mixture is evaporated to dryness in vacuo. The residual dl-ψ-1-(4-nitro-1-naphthyl)-2-dichloroacetamido-3-acetoxypropane-1-ol is purified by recrystallization from ethanol. The formula of this product is,

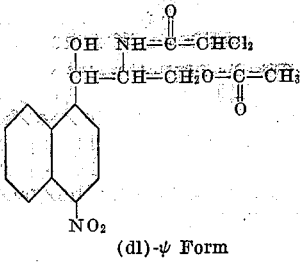

(dl)-ψ Form

Example 4

8 g. of (dl)-ψ-1-(4-nitro-1-naphthyl)-2-aminopropane-1,3-diol is heated with an excess of dichloroacetic anhydride at 70° C. for fifteen minutes. The reaction mixture is evaporated to dryness in vacuo and the residue recrystallized from ethanoal. The white crystalline product thus obtained is (dl)-ψ-1-(4-nitro-1-naphthyl)-2-dichloroacetamido-3-dichloroacetoxypropane-1-ol of the formula,

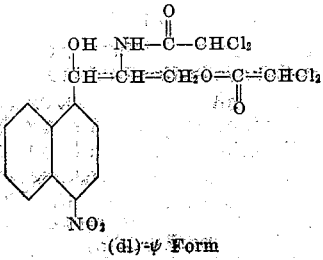

(dl)-ψ Form

Example 5

10 g. of (dl)-ψ-1-(4-nitro-1-naphthyl)-2-aminopropane-1,3-diol is heated with an excess of acetic anhydride at 70° C. for fifteen minutes. The reaction mixture is evaporated to dryness in vacuo and the residue recrystallized from ethanol. The white crystalline product thus obtained is (dl)-ψ-1-(4-nitro-1-naphthyl)-2-acetamido-3-acetoxypropane-1-ol of the formula,

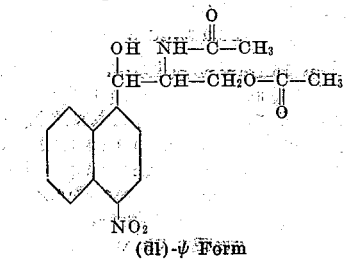

(dl)-ψ Form

Example 6

A mixture consisting of 2 g. of (dl)-reg.-1-(4-methoxy-2-naphthyl)-2-cyanoacetamidopropane-1,3-diol and 4.4 g. of furoic anhydride in 10 cc. of dry pyridine is heated for one hour on the steam bath. The reaction mixture is diluted with 70 cc. of 2 N hydrochloric acid, the precipitated solid is collected and washed with sodium bicarbonate solution and then with water. Recrystallization from ethyl acetate yields the desired (dl)-reg.-1-(4-methoxy-2-naphthyl)-2-cyanoacetamido-3-furoyloxypropane-1-ol of the formula,

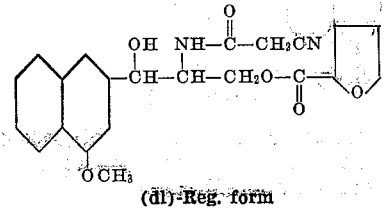

(dl)-Reg. form

Example 7

A mixture consisting of 4 g. of (dl)-ψ-1-(3,6-dichloro-1-naphthyl)-2-carbobenzoxylactamido-propane-1,3-diol and 5 cc. of methoxyacetic anhydride is heated at 90–100° C. for one-half hour. The solution is diluted with 5 volumes of petroleum ether, the solid product collected and recrystallized from ethanol. The product thus obtained is (dl)-ψ-1-(3,6-dichloro-1-naphthyl)-2-carbobenzoxylactamido-3-methoxyacetoxypropane-1-ol of formula,

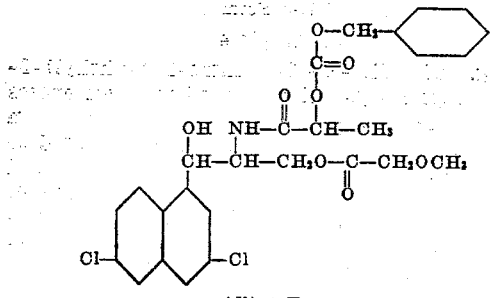

(dl)-ψ Form 2 g. of the carbobenzoyloxylactamido derivative prepared above is dissolved in 30 cc. of glacial acetic acid and reduced catalytically in the presence of palladium oxide. The catalyst is removed by filtration, the filtrate evaporated to dryness in vacuo and the residue crystallized from ethanol to obtain the desired (dl)-ψ-1-(3,6-dichloro-1-naphthyl)-2-lactamido-3-methoxyacetoxypropane-1-ol of the formula,

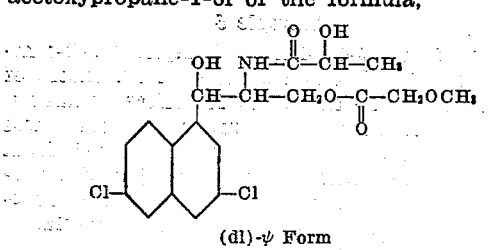

(dl)-ψ Form

Example 8

25 g. of 5-ethyl-1-naphthyl α-benzamido-β-benzoyloxyethyl ketone is dissolved in 500 ml. of ethanol and 2.5 g. of Raney nickel hydrogenation catalyst is added. The mixture is shaken with gaseous hydrogen under about 50 lbs./sq. in. pressure for three to four hours at room temperature. The catalyst is removed by filtration, the filtrate heated to boiling and mixed with a half volume of hot water. The (dl)-ψ-1-(5-ethyl-1-naphthyl)-2-benzamido-3-benzoyloxypropane-1-ol which separates from the cool solution is collected and purified by recrystallization from ethanol. The formula of this product is,

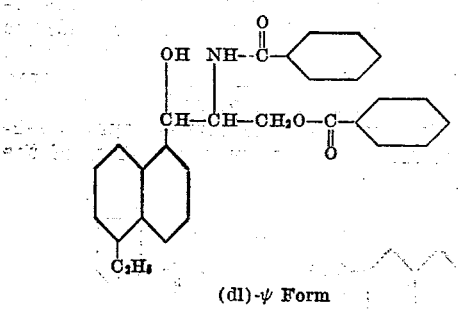

(dl)-ψ Form

If desired, the corresponding (dl)-reg. isomer which is more soluble may be recovered from the aqueous ethanol filtrate.

Example 9

4 cc. of phenylacetyl chloride is added in small portions to a suspension of 2.0 g. of (dl)-reg.-1-(6-iodo-1-naphthyl)-2-aminopropane-1,3-diol in 30 cc. of 1 N sodium hydroxide solution. After a short time the precipitated solid is collected and purified by recrystallization from methanol to obtain the (dl)-reg.-1-(6-iodo-1-naphthyl)-2-phenylacetamido-3-phenylacetoxypropane-1-ol of formula,

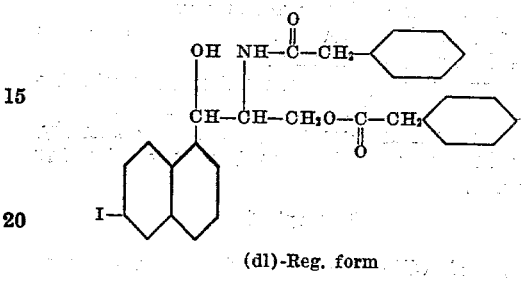

(dl)-Reg. form

Example 10

5 g. of p-toluyl chloride is added in small portions to a suspension of 5.5 g. of (dl)-reg.-1-(1,8-dibromo-2-naphthyl)-2-nicotinamidopropane-1,3-diol in 25 cc. of 1 N sodium hydroxide solution with shaking. After the odor of p-toluyl chloride has disappeared, the solid product is collected and purified by recrystallization from methanol. The product thus obtained is (dl)-reg.-1-(1,8-dibromo-2-naphthyl)-2-nicotinamido-3-p-toluyloxypropane-1-ol of formula,

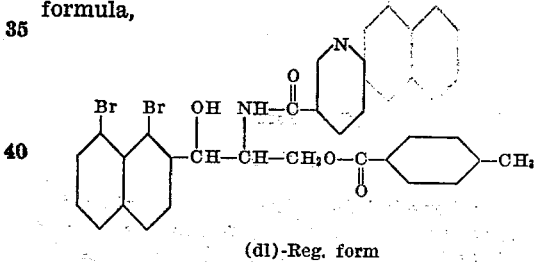

(dl)-Reg. form

Example 11

10 g. of 7-ethoxy-1-naphthyl α-succinamido-β-succinoyloxyethyl ketone is dissolved in 400 cc. of ethanol, and 2.2 g. of Raney nickel hydrogenation catalyst is added. The mixture is shaken with gaseous hydrogen under about 50 lbs./sq. in. pressure for three to four hours at room temperature. The catalyst is removed by filtration, the filtrate heated to boiling and mixed with a half volume of hot water. The (dl)-ψ-1-(7-ethoxy-1-naphthyl)-2-succinamido-3-succinoyloxypropane-1-ol is collected and purified by recrystallization from ethanol. The formula of this product is,

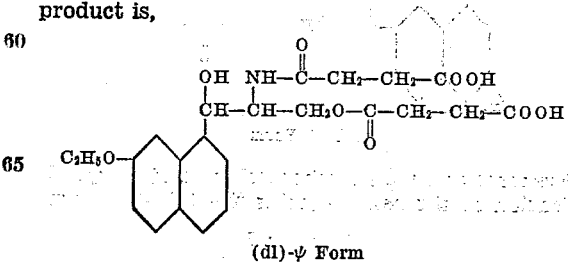

(dl)-ψ Form

Example 12

3 g. of crotonyl chloride is added to a solution of 2 g. of (dl)-reg.-1-(1-naphthyl)-2-aminopropane-1,3-diol in 5 cc. of dry pyridine and the mixture allowed to stand for 24 hours. The solution is diluted with 35 cc. of 2 N hydrochloric acid and the (dl)-reg.-1-(1-naphthyl)-2-crotonylamido - 3 - crotonyloxypropane - 1 - ol collected and purified by recrystallization from methanol. The formula of this product is,

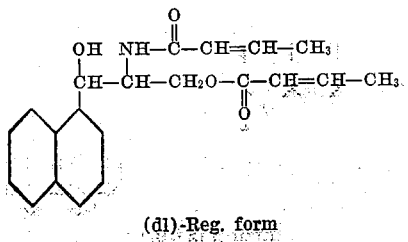

(dl)-Reg. form

*Example 13*

A mixture consisting of 4 g. of (d)-ψ-1-(1-naphthyl) - 2 - acetoxyacetamidopropane - 1,3-diol and 5.8 g. of furoic anhydride in 10 cc. of dry pyridine is heated for one hour on a steam bath. The reaction mixture is diluted with 70 cc. of 2 N hydrochloric acid, the precipitated solid collected and washed with sodium bicarbonate solution and then with water. Recrystallization from ethyl acetate yields (d)-ψ-1-(1-naphthyl)-2 - acetoxyacetamido - 3 - furoyloxylpropane - 1-ol of the formula,

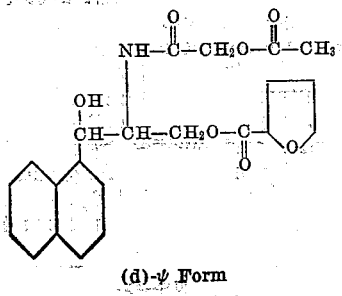

(d)-ψ Form

*Example 14*

10 g. of 4,6-dimethyl-2-naphthyl α-propionamido-β-nicotinoyloxyethyl ketone is dissolved in 200 cc. of ethanol, and 1 g. of Raney nickel hydrogenation catalyst is added. The mixture is shaken with gaseous hydrogen under about 50 lbs./sq. in. pressure from three to four hours at room temperature. The catalyst is removed by filtration, the filtrate heated to boiling and mixed with a half volume of hot water. The (dl)-ψ-1-(4,6-dimethyl - 2 - naphthyl) -2-propionamido-3-nicotinoyloxypropane-1-ol which separates is collected and purified by recrystallization from dilute ethanol. The formula of this product is

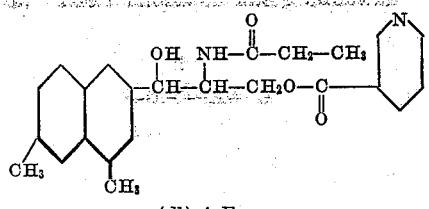

(dl)-ψ Form

In the foregoing examples we have employed a new class of amino diols and their monoacyl derivatives as starting materials. These starting materials can be prepared in a number of different ways. One of the general methods which can be used to prepare these products is that represented by the following diagram:

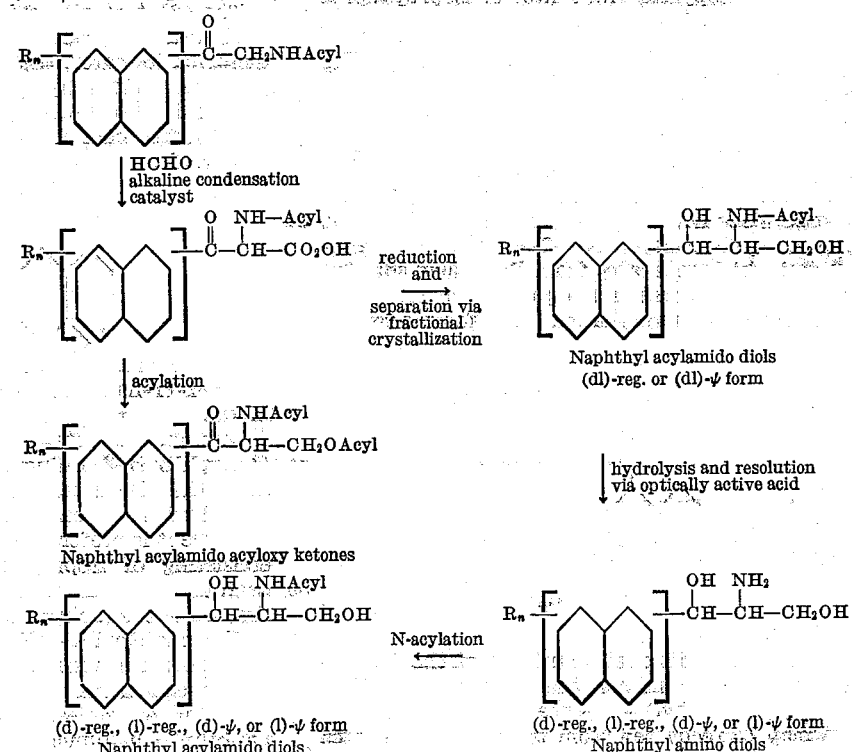

where R and n have the same significance as given above. Where optically active starting materials are desired, the racemic structural forms of the free amino diols are resolved into their optical isomers via an optically active acid addition salt. Optically active acids suitable for this resolution include d-tartaric acid or its diacetyl or dibenzoyl derivatives, d-camphor sulfonic acid, d-bromo-camphor sulfonic acid, d-mandelic acid and the like. The optically active amino diols so obtained can be used as starting materials per se or are converted by acylation as shown above to the optically active N-acylamido diol starting materials of the invention.

The following examples serve to illustrate the application of this general method to the preparation of some of the specific starting materials used in the foregoing examples. For example, (dl)-

ψ-1-(1-naphthyl)-2-aminopropane-1,3-diol, the starting material used in Example 1, can be prepared as follows:

(a) 60 g. of 1-naphthyl acetamidomethyl ketone is mixed with 300 cc. of methanol and 75 cc. of 40% formalin. 2 g. of sodium bicarbonate is added and the mixture stirred at room temperature for about one hour during which time the desired product separates. The insoluble 1-naphthyl α-acetamido-β-hydroxyethyl ketone of formula,

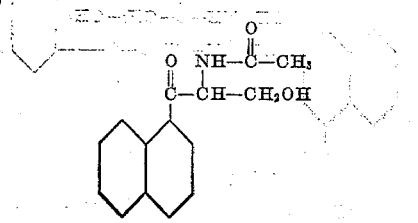

is collected and purified by recrystallization from ethyl acetate.

(b) A mixture consisting of 53 g. of 1-naphthyl α-acetamido-β-hydroxyethyl ketone, 75 g. of aluminum isopropylate and 1 liter of isopropanol is heated under reflux in an atmosphere of nitrogen for about five hours. During the refluxing period the acetone which has formed is distilled off from the mixture. The isopropanol is distilled from the reaction mixture under reduced pressure and the residue treated with about 1 liter of water. The mixture is heated to boiling to insure complete precipitation of the aluminum hydroxide, filtered while hot and the filtrate allowed to cool. The (dl)-ψ-1-(1-naphthyl)-2-acetamidopropane-1,3-diol which separates from the cooled solution is collected by filtration and purified by recrystallization from dilute ethanol. The fomula of this product is,

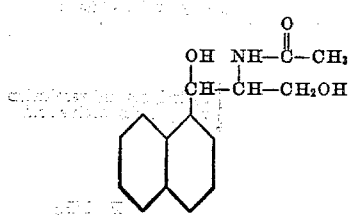

(dl)-ψ Form

If desired, additional quantities of the (dl)-ψ-strutural isomer and also the corresponding (dl)-reg.-1-(1-naphthyl)-2-acetamidopropane-1,3-diol may be recovered from the aqueous filtrates by saturation of the filtrate with salt, exhaustive extraction with ethyl acetate, and followed by distillation of the ethyl acetate from the extract. The residue which consists of a mixture of the two structural forms is separated by crystallization from water or dilute ethanol.

(c) 25 g. of (dl)-ψ-1-(1-naphthyl)-2-acetamidopropane-1,3-diol is heated with 600 cc. of 5% hydrochloric acid for twelve hours. The reaction mixture is cooled and the hydrochloric salt of (dl)-ψ-1-(1-naphthyl)-2-aminopropane-1,3-diol which separates collected and washed with a small amount of water. The hydrochloride salt thus obtained is dissolved in water or suspended therein and the mixture treated with an excess of concentrated ammonium hydroxide. The (dl)-ψ-1-(1-naphthyl)-2-aminopropane-1,3-diol free base which separates is collected, washed with a small amount of water and purified by recrystallization from water. The formula of this product is,

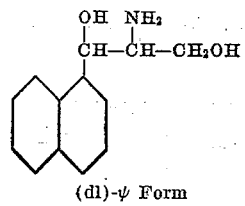

(dl)-ψ Form (d) 5 g. of (dl)-ψ-1-(1-naphthyl)-2-aminopropane-1,3-diol is dissolved in a minimum amount of water containing a small amount of methanol and the resulting solution is treated with an aqueous solution containing an equivalent amount of (d)-tartaric acid. The solution is evaporated to dryness in vacuo and the residue fractionally crystallized from a minimum amount of hot methanol. The first isomer to separate from the solution in crystalline form is the (d)-tartaric acid salt of (l)-ψ-1-(1-naphthyl)-2-aminopropane-1,3-diol. The (d)-tartaric acid salt of (d)-ψ-1-(1-naphthyl)-2-aminopropane-1,3-diol is recovered from the filtrates after removal of the salt of the (l)-isomer.

The (d)-tartaric acid salt of (l)-ψ-1-(1-naphthyl)-2-aminopropane-1,3-diol obtained above is dissolved in water, the solution made alkaline to pH 9 with sodium hydroxide solution and the precipitated (l)-ψ-1-(1-naphthyl)-2-aminopropane-1,3-diol free base collected. The formula of this product is,

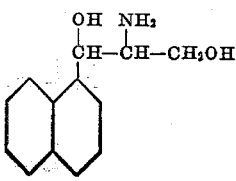

By decomposing the (d)-tartaric acid salt of (d)-ψ-1-(1-naphthyl)-2-aminopropane-1,3-diol in the same manner as described above for the (l)-isomer one obtains the free base of (d)-ψ-1-(1-naphthyl)-2-aminopropane-1,3-diol. If desired, the (d)-tartaric acid used above may be replaced with (d)-camphor sulfonic acid. In this instance it is preferable to use a reaction mixture consisting of isopropanol or n-butanol rather than the methanol used in the fractional crystallization of the tartrate salts.

The naphthyl α-acylamido-β-acyloxyethyl ketones used as starting materials in the practice of this invention may be prepared according to the following examples. For instance, 6-methyl-2-naphthyl α-p-toluylamido-β-acetoxyethyl ketone, the starting material in Example 2 is prepared as follows:

20 g. of 6-methyl-2-naphthyl α-(p-toluylamido)-β-hydroxyethyl ketone is heated at about 75° C. for one-half hour with 40 cc. of acetic anhdyride containing a very small amount of concentrated sulfuric acid. The reaction mixture is evaporated to dryness in vacuo, the residue washed with ice water and purified by recrystallization from methanol or ethanol. The product thus obtained is 6-methyl-2-naphthyl α-(p-toluylamido)-β-acetoxyethyl ketone of the formula,

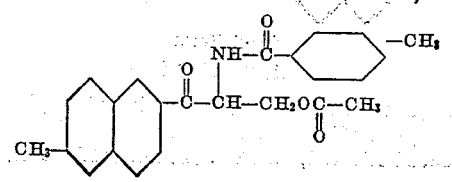

What we claim is:
1. A compound of formula,

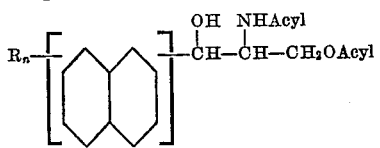

where n is one of the integers 1 and 2 and R is a member of the class consisting of hydrogen, halogen, nitro, lower alkyl and lower alkoxy radicals.

2. A compound of formula,

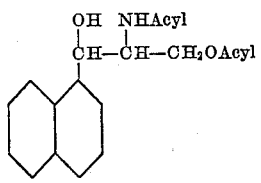

3. (dl) - $\psi$ - 1 - (1-naphthyl) - 2 - acetamido-3-acetoxypropane-1-ol.

4. A compound of formula,

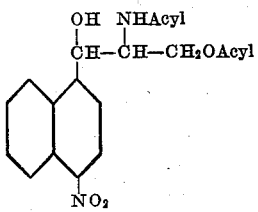

5. (dl)-$\psi$-1-(4 - nitro-1-naphthyl)-2-dichloroacetamido-3-acetoxypropane-1-ol.

6. (dl)-$\psi$-1-(4 - nitro-1-naphthyl)-2-dichloroacetamido-3-dichloroacetoxypropane-1-ol.

7. (dl)-$\psi$-1-(4 - nitro-1-naphthyl)-2-acetamido-3-acetoxypropane-1-ol.

LOREN M. LONG.
HARVEY D. TROUTMAN.

No references cited.